United States Patent
Martinelli

(10) Patent No.: US 12,544,844 B2
(45) Date of Patent: Feb. 10, 2026

(54) THREAD REPAIR TOOL

(71) Applicant: RTX Corporation, Farmington, CT (US)

(72) Inventor: Zachary Joseph Martinelli, Bristol, CT (US)

(73) Assignee: RTX CORPORATION, Farmington, CT (US)

( * ) Notice: Subject to any disclaimer, the term of this patent is extended or adjusted under 35 U.S.C. 154(b) by 605 days.

(21) Appl. No.: 17/985,837

(22) Filed: Nov. 12, 2022

(65) Prior Publication Data

US 2024/0157456 A1    May 16, 2024

(51) Int. Cl.
B23G 9/00 (2006.01)
B23G 5/02 (2006.01)
B23G 5/06 (2006.01)

(52) U.S. Cl.
CPC .............. B23G 9/009 (2013.01); B23G 5/02 (2013.01); B23G 5/062 (2013.01)

(58) Field of Classification Search
CPC . B23G 5/02; B23G 5/06; B23G 5/062; B23G 9/009; B23G 2200/16; B23G 2200/44; B23P 6/00
See application file for complete search history.

(56) References Cited

U.S. PATENT DOCUMENTS

| | | | |
|---|---|---|---|
| 2,671,381 A | 3/1954 | Carlson | |
| 3,550,173 A * | 12/1970 | Gawlik, Sr. ............ | B23G 5/062 470/199 |
| 3,945,069 A * | 3/1976 | Cecil ..................... | B23G 5/06 408/229 |
| 4,090,808 A * | 5/1978 | Nannen .................. | B23G 5/06 408/222 |
| 4,661,028 A | 4/1987 | Sanger | |

(Continued)

FOREIGN PATENT DOCUMENTS

| CN | 102179576 A | * | 9/2011 | ............... B23G 5/06 |
|---|---|---|---|---|
| CN | 213257558 U | * | 5/2021 | |

(Continued)

OTHER PUBLICATIONS

EPO Extended European Search Report corresponding to EP Application No. 23209533.1, Mailing Date, Apr. 9, 2024.

Primary Examiner — Jennifer H Gay
(74) Attorney, Agent, or Firm — CANTOR COLBURN LLP

(57) ABSTRACT

A thread repair tool for rethreading a blind tapped hole having damaged threads above undamaged threads of the hole, including: a shaft having a plurality of curved surfaces that extend from a top end of the shaft to a bottom end of the shaft, the plurality of curved surfaces being concave with respect to an exterior perimeter of the shaft; and wherein the shaft has a plurality of corner portions, each one of the plurality of corner portions being located in between two of the plurality of curved surfaces, a first pair of the plurality of corner portions extending from the top end to the bottom end, and a second pair of the plurality of corner portions having a threaded area proximate to the bottom end, the first pair of the plurality of corner portions being adjacent to each other and the second pair of the plurality of corner portions being adjacent to each other.

10 Claims, 4 Drawing Sheets

(56) References Cited

U.S. PATENT DOCUMENTS

| | | | | |
|---|---|---|---|---|
| 5,281,059 | A | * | 1/1994 | Stuckle ................. B23G 9/009 470/201 |
| 5,718,636 | A | | 2/1998 | Meyn et al. |
| 7,147,413 | B2 | * | 12/2006 | Henderer ................ B23G 5/06 408/222 |
| 8,944,728 | B2 | * | 2/2015 | Vokel .................... B23B 31/005 408/222 |
| 9,079,262 | B2 | * | 7/2015 | Dilanchian ............ B23G 9/009 |
| 9,227,256 | B2 | | 1/2016 | Emerson |
| 2004/0170482 | A1 | * | 9/2004 | Henderer ................ B23G 5/06 408/222 |
| 2011/0176880 | A1 | * | 7/2011 | Volkel ..................... B23G 5/06 408/217 |
| 2013/0223944 | A1 | * | 8/2013 | Dilanchian ............ B23G 9/009 408/1 R |
| 2018/0185941 | A1 | * | 7/2018 | Klein .................... B27G 15/00 |
| 2022/0161341 | A1 | * | 5/2022 | Maeda ................... B23G 5/062 |
| 2023/0094117 | A1 | | 3/2023 | Kopton |
| 2024/0157456 | A1 | * | 5/2024 | Martinelli ............. B23G 5/062 |
| 2024/0351123 | A1 | * | 10/2024 | Maeda ..................... B23G 1/16 |
| 2024/0375199 | A1 | * | 11/2024 | Bihrer ..................... B23G 5/06 |

FOREIGN PATENT DOCUMENTS

| | | | | | |
|---|---|---|---|---|---|
| CN | 113894371 | A | * | 1/2022 | ............ B23G 9/009 |
| CN | 119282276 | A | * | 1/2025 | ............ B23G 9/009 |
| DE | 19834039 | A1 | * | 2/1999 | ............ B23G 5/18 |
| DE | 102020109035 | A1 | | 10/2021 | |
| EP | 3950199 | A1 | | 2/2022 | |
| JP | 62148118 | A | * | 7/1987 | ............ B23G 5/062 |
| JP | 3154847 | U | * | 10/2009 | |

* cited by examiner

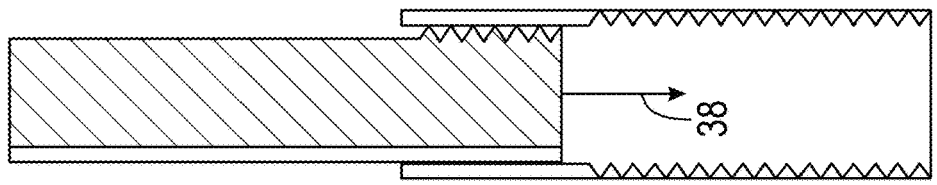
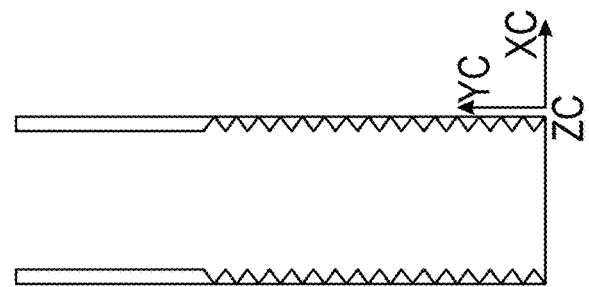
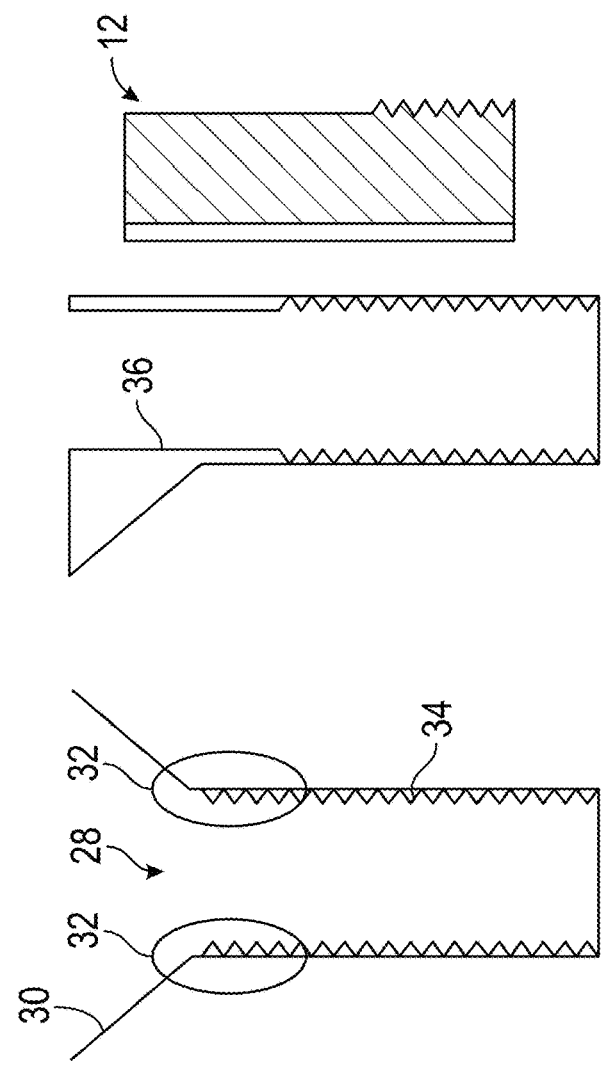
FIG. 4
FIG. 5
FIG. 6
FIG. 7

THREAD REPAIR TOOL

BACKGROUND

This disclosure relates to a thread repair tool, and more particularly to a thread repair tool that can be inserted into below a damaged area so that the threads can be repaired.

Blind threaded holes are commonly formed in metal, plastic or other materials by drilling a hole, and then thereafter cutting threads in the hole with a tap. A blind threaded hole is a hole that does not extend entirely through the material. In use, a threaded bolt, threaded rod, or the like, with threads matching the hole threads is screwed into the hole. Over time, the blind hole threads may be damaged. Often, the thread damage is restricted to the surface end of the hole, while the threads further in the hole remain undamaged.

Accordingly, it is desirable to provide a tool for repairing or rethreading threads in a blind hole.

BRIEF DESCRIPTION

Disclosed is a thread repair tool for rethreading a blind tapped hole having damaged threads above undamaged threads of the hole, including: a shaft having a plurality of curved surfaces that extend from a top end of the shaft to a bottom end of the shaft, the plurality of curved surfaces being concave with respect to an exterior perimeter of the shaft; and wherein the shaft has a plurality of corner portions, each one of the plurality of corner portions being located in between two of the plurality of curved surfaces, a first pair of the plurality of corner portions extending from the top end to the bottom end, and a second pair of the plurality of corner portions having a threaded area proximate to the bottom end, the first pair of the plurality of corner portions being adjacent to each other and the second pair of the plurality of corner portions being adjacent to each other.

In addition to one or more of the features described above, or as an alternative to any of the foregoing embodiments, a gage pin is configured to be received by at least one of the plurality of curved surfaces.

In addition to one or more of the features described above, or as an alternative to any of the foregoing embodiments, the second pair of the plurality of corner portions has an unthreaded smooth surface that extends from the top end to the threaded area.

In addition to one or more of the features described above, or as an alternative to any of the foregoing embodiments, the shaft has four corner portions.

In addition to one or more of the features described above, or as an alternative to any of the foregoing embodiments, the second pair of the plurality of corner portions has an unthreaded smooth surface that extends from the top end to the threaded area.

In addition to one or more of the features described above, or as an alternative to any of the foregoing embodiments, the shaft has four corner portions.

BRIEF DESCRIPTION OF THE DRAWINGS

The following descriptions should not be considered limiting in any way. With reference to the accompanying drawings, like elements are numbered alike:

FIGS. 4-11 illustrate repair of a blind threaded hole with a thread repair tool in accordance with this disclosure.

DETAILED DESCRIPTION

A detailed description of one or more embodiments of the disclosed apparatus and method are presented herein by way of exemplification and not limitation with reference to the FIGS.

As reference herein, the terms horizontal, upright, vertical, above, below, beneath, and the like, are used solely for the purpose of clarity in illustrating the present disclosure with reference to the figures and should not be taken as words of limitation.

Figure 1:
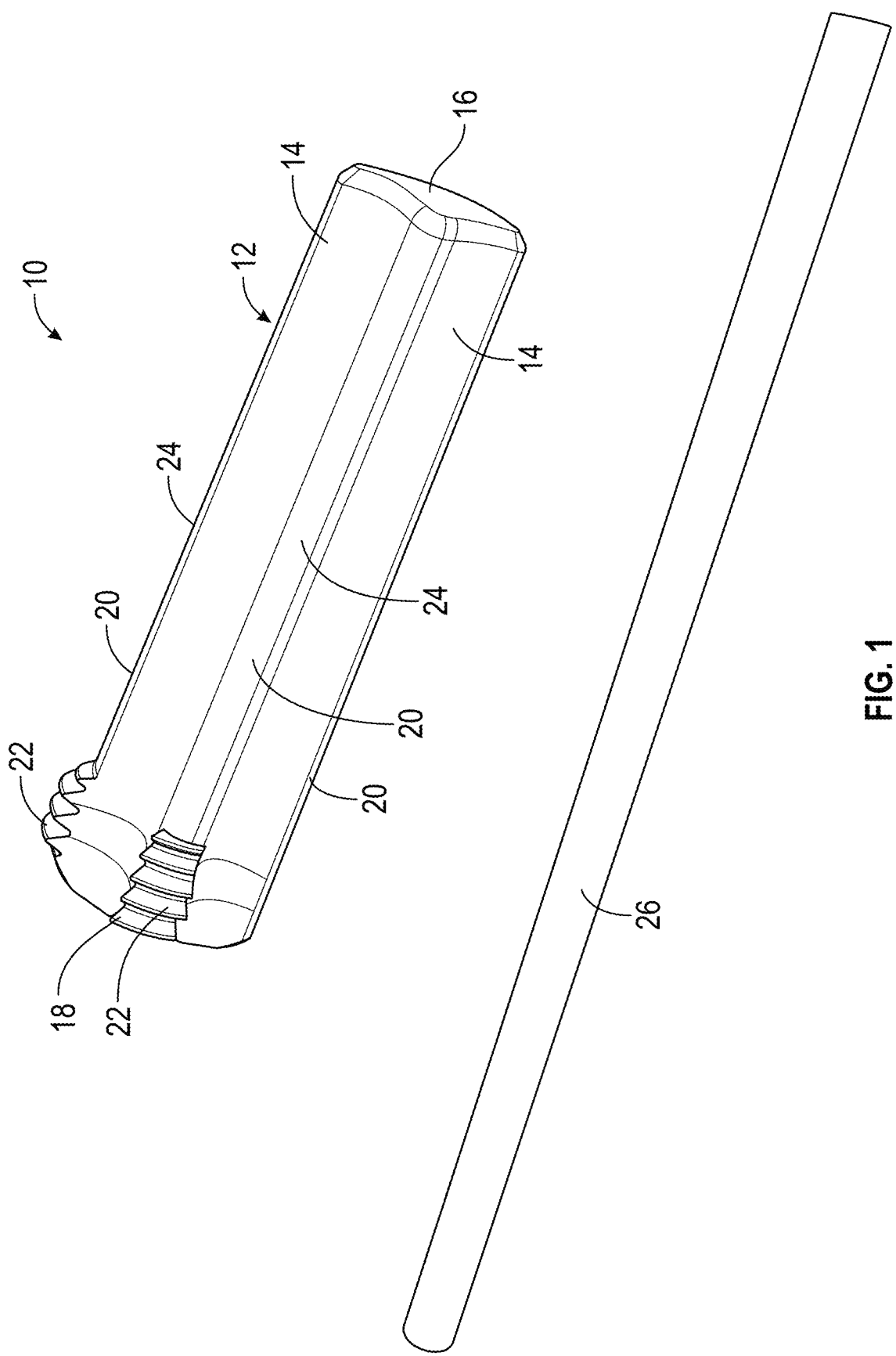
FIG. 1 is a perspective view of a thread repair tool in accordance with this disclosure.
Figure 2:
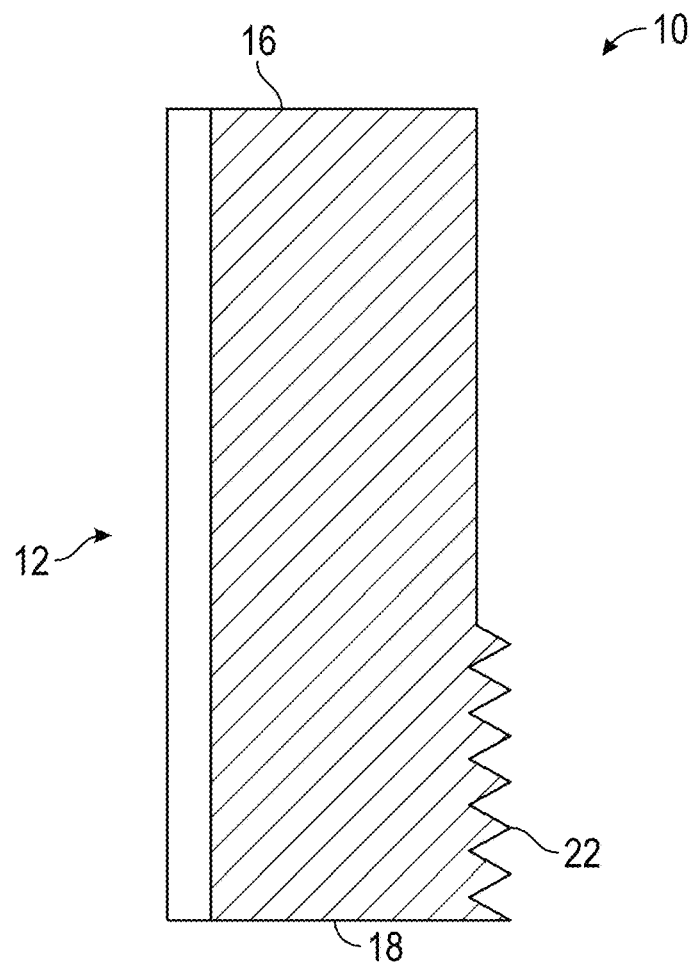
FIG. 2 is a cross-sectional view of a thread repair tool in accordance with this disclosure.
Figure 3:
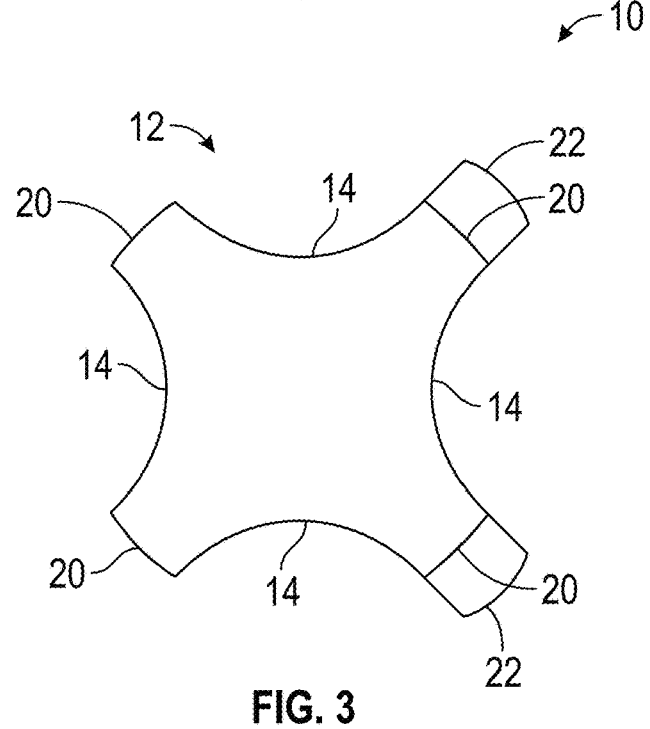
FIG. 3 is a top view of a thread repair tool in accordance with this disclosure.
Figure 11:
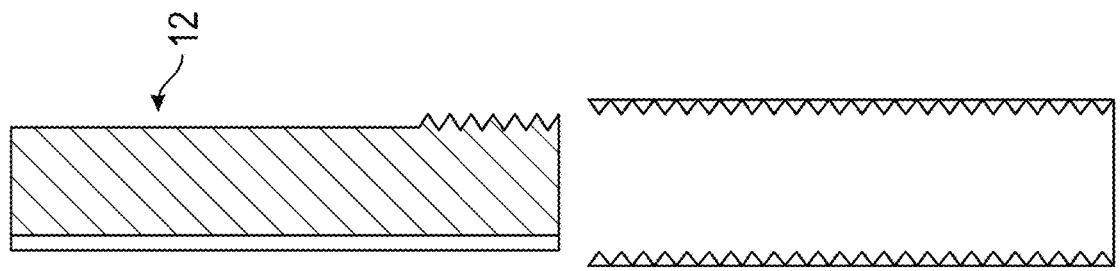

FIGS. 1-3 illustrate a thread repair tool 10 in accordance with this disclosure. The thread repair tool 10 comprises a shaft 12 having a plurality of curved surfaces 14 (one for each side of the shaft 12) that extend from a top end 16 to a bottom end 18. Disposed on opposite sides of each of the curved surfaces is a corner portion 20 each also extending from the top end 16 to the bottom end 18. The plurality of curved surfaces 14 are concave in shape with respect to an exterior perimeter of the shaft 12. In other words, each curved surface 14 curves inwardly from the respective corner portion 20. In the illustrated embodiment, there are four corner portions 20. Of course, the number of corner portions 20 may vary. Alternatively, the plurality of curved surfaces 14 may be formed as depressions (e.g., curved or not) as long as they are depressed with respect to the corner portions.

Proximate to the bottom end 18 of the shaft 12 two adjacent corner portions 20 have a threaded area 22 while the other two adjacent corner portions are unthreaded. The threaded area 22 is located proximate to the bottom end. As such, the other two corner portions 20 have an unthreaded or smooth surface 24 that extends from the top end 16 to the threaded area 22. The two adjacent corner portions 20 with the threaded areas 22 are curved or comprise an arcuate surface so that the threads of the threaded areas 22 can engage the undamaged threads of the blind tapped hole in order repair the damaged threads of the blind tapped hole.

In contrast to the smooth surfaces 24, all of the curved surfaces 14 extend all the way from the top end 16 to the bottom end 18. This allows the thread repair tool 10 to be used with a gage pin 26 when repairing threads as will be discussed herein. In one embodiment, the gage pin 26 will have a circular or curved exterior in order to facilitate its movement along an interior surface of the tapped hole to be rethreaded. Alternatively, the gage pin 26 may have a partially curved surface and another surface (e.g., no curved that is configured to engage a curved or non-curved surface 14 that is formed as a depression (e.g., curved or not) that is depressed with respect to the corner portions (e.g., the alternative embodiment mentioned above).

Referring now to FIGS. 4-11, repair of a blind threaded hole 28 using the thread repair tool 10 in accordance with this disclosure is illustrated. Referring now to FIG. 4 a cross-sectional view of a blind threaded hole 28 is illustrated. In one embodiment, the top portion of the blind threaded hold may have a chamfer 30. Alternatively, no chamfer 30 may be provided.

As mentioned above, an upper portion 32 of the thread 34 may become damaged. FIG. 5 shows the damaged area 32 being repaired with a weld 36 wherein the threads 34 of the upper portion 32 are covered by the weld 36 and need to be rethreaded. However, the threads 34 located below the weld cannot be threaded with a traditional tap as its diameter will be larger than the opening of the hole 28.

In accordance with the present disclosure, the shaft 12 of the thread repair tool 10 can be used for rethreading of the hole 28 as the shaft 12 can have an exterior perimeter that is smaller than the inner diameter of the hole 28 including the weld repair area 36. This allows the shaft 12 to be inserted past the weld 36 in the direction of arrow 38. See at least FIG. 7. This also allows the threaded areas 22 of the shaft 12 to pass the weld 36 and thereafter, the shaft 12 can move horizontally in the direction of arrow 40 so that the threaded areas 22 of the shaft 12 can engage the undamaged threads 34 located below the weld area 36 in order to thread the weld 36. This is illustrated in at least FIG. 8.

Figure 10:
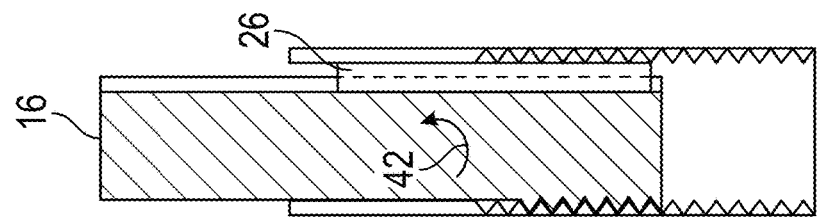
Figure 9:
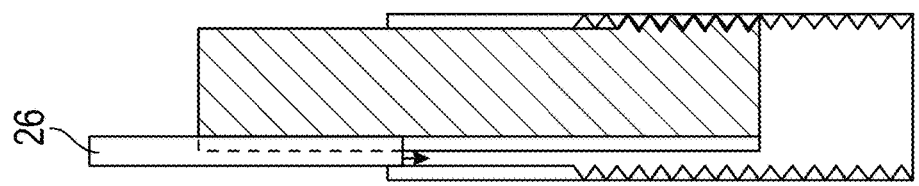
Figure 8:
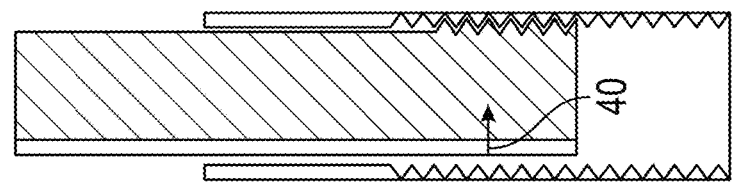

Once at least one or two of threaded areas 22 of the shaft 12 engage the undamaged threads 34 located below the weld 36, the gage pin is inserted between the weld area 36 and one of the curved surfaces 14 of the shaft 12. This will maintain the threaded areas 22 in contact with the undamaged threads 34. The is illustrated in at least FIG. 9. In order to re-tap or thread the weld 36 with a continuation of the threads 34, the shaft 12 is rotated counter clockwise in the direction of arrow 42 by for example, a tool (e.g., wrench, socket or other equivalent item) configured to engage the top end 16 of the shaft 12 such that once the tool has engaged the top end 16 of the shaft and is rotated the shaft 12 will rotate. As such, the shaft is rotated upwardly in a direction opposite to arrow 38 until the weld 36 is now threaded. This is illustrated in at least FIG. 11. While a counter clockwise rotation is illustrated in FIG. 10. It is contemplated that a clockwise rotation may be employed depending on the pitch (e.g., number of threads per inch), type (e.g., standard, metric, ACME, NPT, etc.), and direction (e.g., left or right handed) of the threads 34 to be repaired.

Accordingly, a new thread repair tool 10 is provided wherein the tool 10 is able to be offset and bypass the top repaired minor diameter (that has no thread) and reengage the remaining threads at the bottom of the hole picking up the pitch that otherwise would not have been known. It being understood that a minimal amount of threads are needed for engagement by the thread repair tool 10 or that the thread repair tool 10 can reach the bottom of the hole 28. After engagement, rolls are used to secure the cutting edge to its proper pitch diameter, and it then cuts the new threads from the bottom out reverse direction.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A thread repair tool for rethreading a blind tapped hole having damaged threads above undamaged threads of the hole, comprising:
    a shaft having a plurality of curved surfaces that extend from a top end of the shaft to a bottom end of the shaft, the plurality of curved surfaces being concave with respect to an exterior perimeter of the shaft; and
    wherein the shaft has a plurality of corner portions, each one of the plurality of corner portions being located in between two of the plurality of curved surfaces, a first pair of the plurality of corner portions extending from the top end to the bottom end, and a second pair of the plurality of corner portions having a threaded area proximate to the bottom end, the first pair of the plurality of corner portions being adjacent to each other and the second pair of the plurality of corner portions being adjacent to each other and the first pair of the plurality of corner portions are unthreaded.

2. The thread repair tool as in claim 1, further comprising: a gage pin configured to be received by at least one of the plurality of curved surfaces.

3. The thread repair tool as in claim 2, wherein the second pair of the plurality of corner portions has an unthreaded smooth surface that extends from the top end to the threaded area.

4. The thread repair tool as in claim 3, wherein the shaft has four corner portions.

5. The thread repair tool as in claim 1, wherein the second pair of the plurality of corner portions has an unthreaded smooth surface that extends from the top end to the threaded area.

6. The thread repair tool as in claim 1, wherein the shaft has four corner portions.

7. A thread repair tool for rethreading a blind tapped hole having damaged threads above undamaged threads of the hole, comprising:
    a shaft having a plurality of curved surfaces that extend from a top end of the shaft to a bottom end of the shaft, the plurality of curved surfaces being concave with respect to an exterior perimeter of the shaft;
    a gage pin configured to be received by at least one of the plurality of curved surfaces; and
    wherein the shaft has a plurality of corner portions, each one of the plurality of corner portions being located in between two of the plurality of curved surfaces, a first pair of the plurality of corner portions extending from the top end to the bottom end, and a second pair of the plurality of corner portions having a threaded area proximate to the bottom end, the first pair of the plurality of corner portions being adjacent to each other and the second pair of the plurality of corner portions being adjacent to each other.

8. The thread repair tool as in claim 7, wherein the second pair of the plurality of corner portions has an unthreaded smooth surface that extends from the top end to the threaded area.

9. The thread repair tool as in claim 8, wherein the shaft has four corner portions.

10. The thread repair tool as in claim 7, wherein the shaft has four corner portions.

* * * * *